United States Patent
Beged-Dov et al.

(10) Patent No.: US 6,978,052 B2
(45) Date of Patent: Dec. 20, 2005

(54) ALIGNMENT OF IMAGES FOR STITCHING

(75) Inventors: Gabriel Beged-Dov, Corvallis, OR (US); Michael J Jones, Corvallis, OR (US); Russell Mull, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 561 days.

(21) Appl. No.: 10/059,796

(22) Filed: Jan. 28, 2002

(65) Prior Publication Data

US 2003/0142882 A1  Jul. 31, 2003

(51) Int. Cl.$^7$ .............................................. G06K 9/36
(52) U.S. Cl. ..................................... 382/284; 345/629
(58) Field of Search ........ 345/629–641; 348/584–601; 382/284

(56) References Cited

U.S. PATENT DOCUMENTS

| | | | | |
|---|---|---|---|---|
| 1,819,217 A | * | 8/1931 | Watson ......................... | 40/433 |
| 4,280,135 A | * | 7/1981 | Schlossberg ................. | 348/61 |
| 5,140,647 A | * | 8/1992 | Ise et al. ..................... | 382/284 |
| 5,185,808 A | * | 2/1993 | Cok ............................ | 382/284 |
| 5,646,679 A | * | 7/1997 | Yano et al. ................... | 348/47 |
| 5,663,806 A | * | 9/1997 | Grise et al. .................. | 358/406 |
| 5,823,192 A | * | 10/1998 | Kalend et al. ............... | 128/845 |
| 5,874,722 A | * | 2/1999 | Rando et al. .......... | 235/472.01 |
| 5,966,553 A | | 10/1999 | Nishitani et al. ............ | 396/303 |
| 5,982,951 A | * | 11/1999 | Katayama et al. .......... | 382/284 |
| 5,990,973 A | | 11/1999 | Sakamoto ................... | 348/576 |
| 6,009,209 A | | 12/1999 | Acker et al. ................. | 382/275 |
| 6,016,354 A | | 1/2000 | Lin et al. .................... | 382/117 |
| 6,259,826 B1 | | 7/2001 | Pollard et al. .............. | 382/284 |
| 6,278,491 B1 | | 8/2001 | Wang et al. ................. | 348/370 |

OTHER PUBLICATIONS http://www.panoguide.com-the guide to panoramas and panoramic photography; Pan Guide.Com; Dec. 17, 2001; 1 page.
http://www.panoguide.com/software/reviews/realviz_stitcher_v31/—REALVIZ Stitcher v3.1; Pan Guide.Com; Dec. 17, 2001; pp. 1-4.
http://www.panoguide.com/software/reviews/3dvista_studio_v18/—3DVista Studio v1.8; Pan Guide.Com; Dec. 17, 2001; pp. 1-6.
http://www-4.ibm.com/software/net.media/—IBM Software: Graphics-Multimedia-HotMedia-Overview; HotMedia; IBM; Dec. 17, 2001; pp. 1-2.
http://www-4.ibm.com/software/net.media/features.html; IBM Software Graphics-MultiMedia-HotMedia-Features; IBM; HotMedia; Dec. 17, 2001; pp. 1-2.
"Stitcher 3.0"—MultiMedia; Nov. 2001; MacAddict; p. 55.
http://www.realviz.com/products/st/index.php; REALVIZ.com—Stitcher 3.0; Oct. 1, 2001; pp. 1-2.

* cited by examiner

Primary Examiner—Kanjibhai Patel
Assistant Examiner—Sath V. Perungavoor
(74) Attorney, Agent, or Firm—Raymond A. Jenski

(57) ABSTRACT

The complexity of image stitching into a panoramic image is simplified with the use of one or more projectable fiducial marks that ease the establishment of a relationship between adjacent scenes of an image without leaving undesirable fiducial vestiges in the final image. A fiducial generator, having a controllable source of illumination, is positionable to project the fiducial into adjacent and overlapping scenes.

13 Claims, 6 Drawing Sheets

ALIGNMENT OF IMAGES FOR STITCHING

BACKGROUND

The present invention relates to enhanced image capturing methods and apparatus and more particularly relates to the use of fiducial marks in image capturing devices to place fiducial marks in related images to improve and automate the stitching of related images together into a panoramic image.

Photography is a well known and widely used technique for capturing images for later appreciation and use. Digital photography—digital image capturing—is a recent development made possible by lower cost optical to electronic conversion devices such as relatively high resolution charge coupled device (CCD) arrays and similar mechanisms, more powerful and energy efficient microprocessors, and small and low cost memory devices. Advantages to the user of a digital camera, as it is commonly known, are the ability to capture, store, and immediately view a picture, the ability to correct defects in the stored picture either in situ or later using a computer system, the ability to erase and retake a similar picture, and the ease and ability to digitally transmit the picture to others. The immediacy and the correction ability has stimulated others to produce and offer application programs (for example Stitcher™ 3.0 offered by RealViz S.A.) that merge overlapping images together into a panoramic scene while correcting for lens distortion, color, and brightness across the panoramic scene—so long as the overlap is about 30% or more. Of course, panoramic scenes have also been created using digital movie techniques, but these scenes are viewed over time rather than as an instantaneous presentation.

Image stitching application programs rely upon the ability to locate the same objects appearing in overlapping scenes in order to provide alignment targets. Scenes that do not contain easily locatable objects in the overlap area are problematic for the stitching algorithms. Thus, a technology that simplifies the relationship between scenes without leaving undesirable vestiges in the final image would greatly improve the speed and quality of stitched images.

SUMMARY OF THE INVENTION

An apparatus for and a method of enabling the stitching of digital images together includes the generation of a fiducial and the projection of the fiducial into a subject scene. The first portion of the subject scene is captured as a first image and includes the projected fiducial. A second portion of the subject scene is captured as a second image which also includes the projected fiducial and overlaps at least that part of the first portion that contains the fiducial.

DESCRIPTION OF A PREFERRED EMBODIMENT

Figure 1:
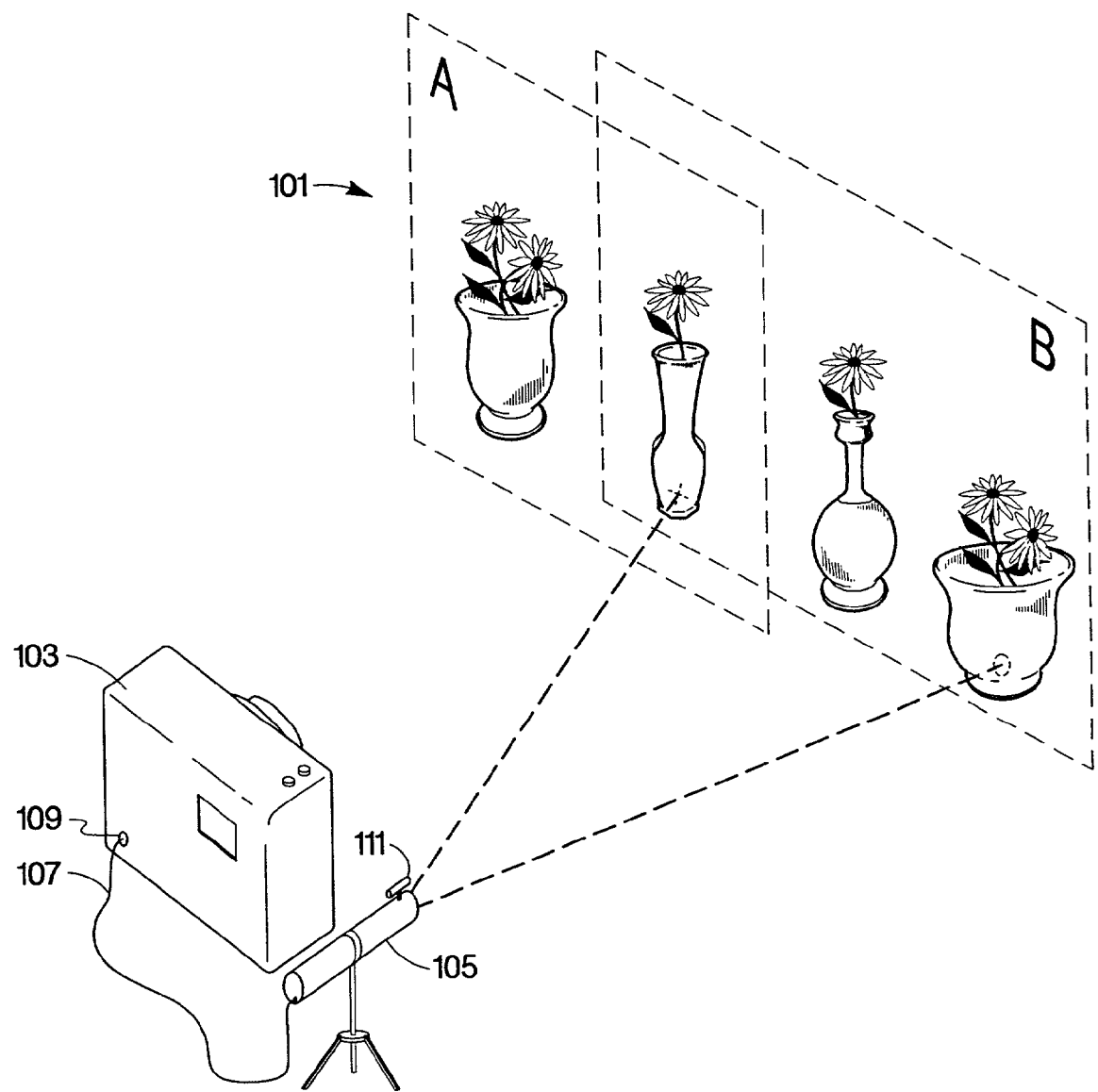
FIG. 1 is a representation of an environment which would accommodate the present invention.

An enhanced image capturing device, such as a digital camera, coupled to a positionable reference uses fiducial marks placed into a scene by a fiducial mark generator to improve and automate the stitching of related images together into a panoramic image. Such an arrangement is shown in the representation of FIG. 1. A scene 101 is visible to a digital camera 103 in at least two parts, part A and part B as framed by the camera's optics and two user orientations of the camera. The user ultimately wishes to create a panoramic picture of scene part A and scene part B. In order to avoid difficulties experienced by earlier stitching application programs like requiring a minimum scene overlap and the necessity of clearly recognizable objects in the overlapped scenes, a reference mark, a fiducial, is placed into the overlap region of the scene being photographed.

In a preferred embodiment of the present invention, the user is provided an external fiducial generating device 105, mounted on a stable support, such as a tripod, external to the camera. The fiducial generating device receives its power and control information via a control cable 107 connected to a control port 109 located on the camera body. The fiducial generating device projects one or more marks of predetermined shape and color onto one or more objects in the scene selected by the user. As shown in FIG. 1, one of the fiducials is an "X" and another of the fiducials is an "O". In advanced systems, the fiducials are selected by the user to be a meaningful character or set of characters such as "1", "2", etc., which may provide meaning to its presence in the stored digital representation of the captured scene. In any event, the "X" fiducial is placed by the user in a position of scene part A which will overlap with scene part B, thus providing a common reference mark that can be used later to stitch the scenes together. The "O" fiducial is placed in a non-overlapping part of scene B, but can be expected to be used if a third scene part, part C (not shown), is to be included in the panoramic composite. One or more adjustment devices 111 is placed on the fiducial generating device to allow moving a fiducial mark into another scene without moving the fiducial generating device itself.

Figure 2:
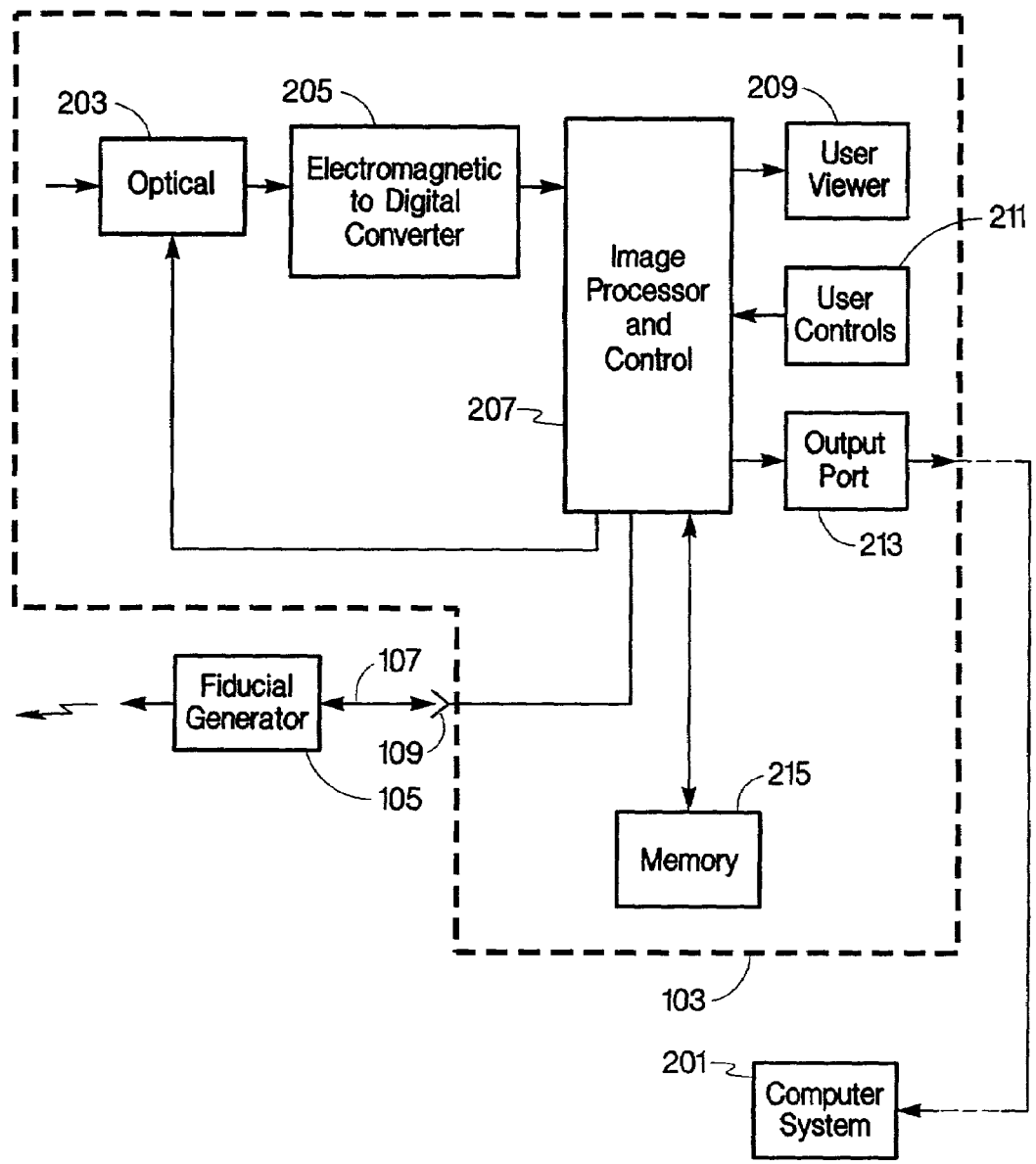
FIG. 2 is a block diagram of a digital camera, fiducial generator, and computer which may employ the present invention.

A block diagram of a digital camera 103 coupled to the fiducial generator 105 and a separate user computer system 201 is shown in FIG. 2. The selected scene is timed and focused in conventional digital camera fashion by the lenses and shutters of the optical portion 203 upon an electromagnetic to digital converter 205, which in the preferred embodiment is a 1600×1200 pixel, nominally 100 mm square area CCD substrate. Electronic "shutter" speed, white balance, focus, pixel scan speed, and other image capture parameters as well as user interface and memory control are performed by an image processor and control 207. Additionally, the image processor and control interfaces to and controls the fiducial generator 105 via the control port 109 and cable 107. The user interfaces include a 5 cm (2 inch) TFT color LCD viewer 209 for scene selection and user controls 211 for activating the shutter and for interacting with the image control and processor. A conventional USB output port 213 is provided to enable interfacing with the user computer system to, inter alia, download stored images from the memory 215. Additional outputs, such as IEEE 1394, Fast IrDA, and composite video may also be provided as enhancements to the output port 213. The memory 215, in the preferred embodiment, is a 32 Mbit CompactFlash™ removable memory element.

Figure 3A:
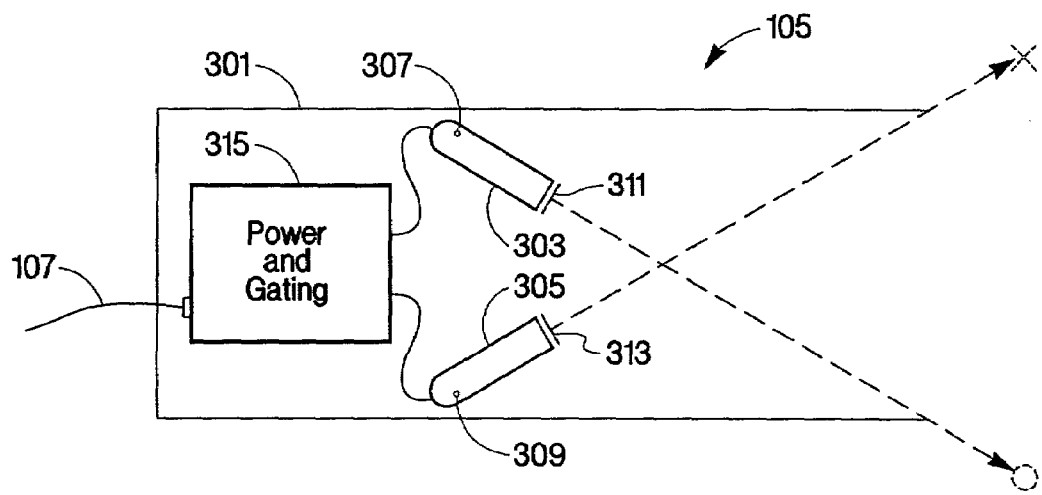
FIG. 3A is a diagram of a fiducial generator which may employ the present invention.
Figure 3B:
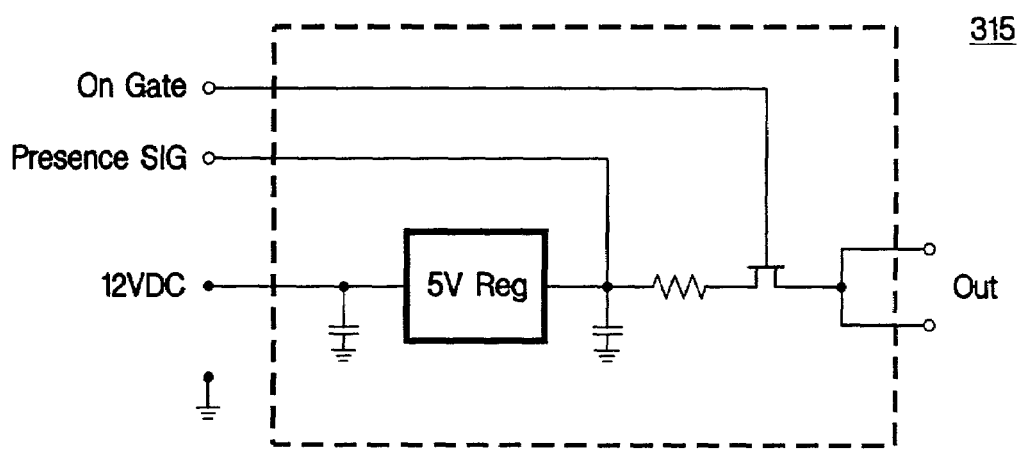
FIG. 3B is a diagram of a power and gating function for the fiducial generator of FIG. 3A.

A diagrammatic cut-away view of the preferred embodiment fiducial generator 105 is depicted in FIG. 3. Contained within a housing 301, which has a type ¼-20 UNC screw thread mounting (not shown) for attachment to a conventional tripod or equivalent stand, are two solid-state class IIIa lasers, 303 and 305, having 1–5 mW of output power at a wavelength of between 640 and 650 nm as preferred illumination sources. (While these lasers provide low power visible red light for ease of alignment and are relatively safe if not pointed directly into the eye, an alternative embodiment can employ a class II (less than 1 mW output power) laser). The lasers are mounted on pivots 307 and 309 respectively and are mechanically coupled to the adjustment device 111 so that the lasers can be aimed at selected targets within the scenes that are to be stitched together. Character masks 311 and 313 are placed at the output of each laser to provide the characteristic fiducial projected by each laser. Power and gating circuitry 315 is coupled to the cable 107 and digital camera 103 to receive electric power and control signals useable to turn the lasers on and off. Alternatively, power is supplied from a source separate from the digital camera. In a simplified version of a fiducial generator, only a single laser is disposed in the housing 301 and it is aimed in a fixed direction.

Figure 4:
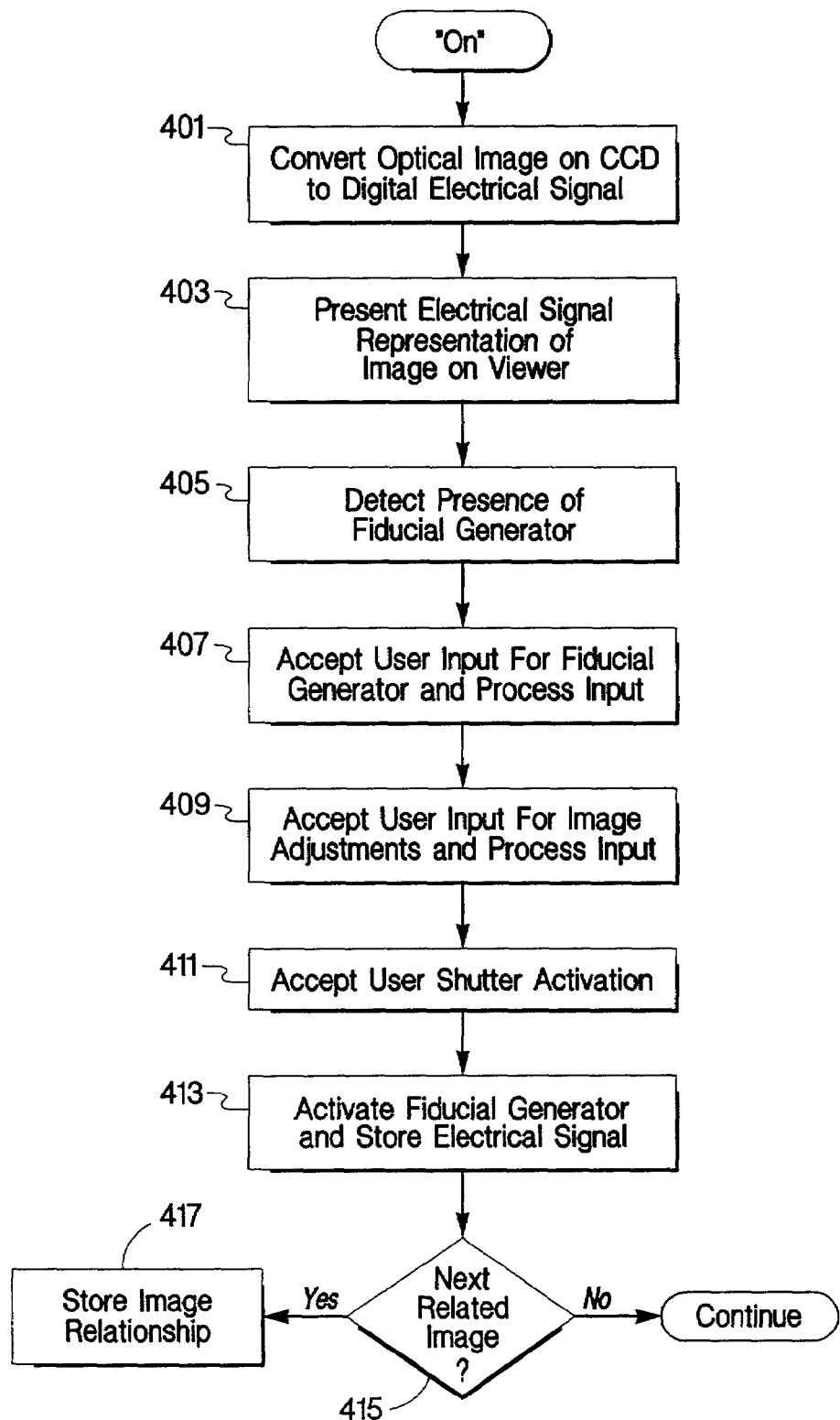
FIG. 4 is a flowchart of an image capture process which may be employed in the present invention.

In operation and after the digital camera 103 is turned on, a process shown in the flowchart of FIG. 4 is followed in the preferred embodiment. The image focused on the camera CCD is converted to a digital electrical signal at 401. This electrical signal representation is presented to the user on the viewer 209, at 403, for the user to aim and prepare the scene. The image processor and control 207 of the digital camera polls the control port 109 to detect the electrical presence of the fiducial generator 105, at 405. In a preferred embodiment, the illumination sources of the fiducial generator are not maintained in a constant "on" condition but are turned on for a period of time, for example 10 seconds, to enable the user to direct the fiducial to a desired position within the selected scene. The user, however, may elect to have the fiducial generator remain on constantly, or for advanced systems, may want to assign particular meaning to unique characters generated and projected by the fiducial generator. In any event, the user enters instructions regarding the fiducial generator at 407, and enters instructions for image adjustments such as focus, shutter speed, etc. at 409. When the user is ready and activates the shutter control button, the digital camera accepts the activation, at 411, energizes the "shutter", activates the fiducial generator to project the fiducials into the scenes to be captured (if they are not already activated), and stores the electrical signal representative of the image, at 413. The shutter is not the traditional mechanical apparatus normally found in photographic film cameras, but is an electronic switch that, in simple terms, electronically energizes the CCD to accept and convert the light photons from the scene to be captured into electronic pulses. Some digital cameras also employ a mechanical optical blocking shutter for improved performance. The user provides an instruction to the camera that there is to be another image taken that is related to (and stitched with) the last image stored. The digital camera accepts the instruction and decides based upon the instruction, at 415, whether there is to be another related image. If there is to be another related image, an indicator of the relationship is stored, at 417, with the last image stored to link the next image with the last. The user may then proceed to reposition the camera to capture the next image without moving the fiducial generator's positioning (thereby maintaining the position of the projected fiducial between the images) and capture the next image. Multiple fiducial generation and projection enable several images to be captured and stitched together with relative ease. If the next image is not to be related to the last, the user may proceed with normal image capture.

Figure 5:
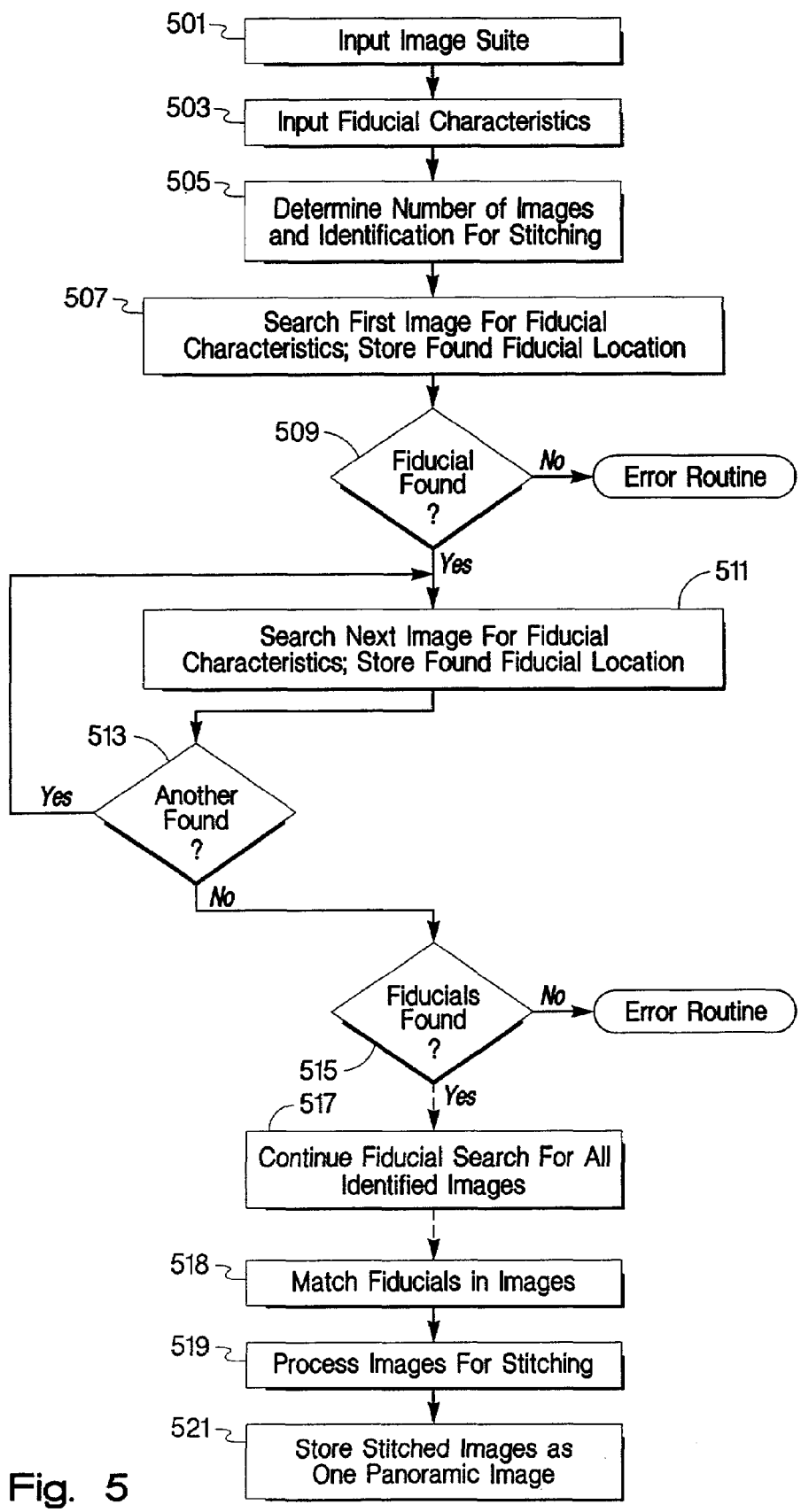
FIG. 5 is a flowchart of an image stitching process which may be employed in the present invention.

Once the user desires to stitch the related images together, the user energizes the digital camera, couples the camera to a computer, and activates the recall of the first set of related images, illustrated in the flowchart of FIG. 5. In a preferred embodiment of the present invention, a stitching process is activated in a user's computer, into which the suite of images have been uploaded from the digital camera. Of course, for those cameras having sufficient processing power, the stitching can occur without the mediation of a separate computer. Referring, now, to the flowchart of FIG. 5, it can be seen that the image suite is to be uploaded into the computer, at 501, from the digital camera. Information and characteristics relating to the one or more fiducials used in each captured image is also uploaded, at 503. The images which are to be stitched into a panoramic image are identified by image identifier and a count of the number of images in each potential panoramic image are uploaded and determined, at 505. It is a feature of the present invention that a substantial amount of information is already known about the fiducial(s) (the shape, the color, the fact that a fiducial is found in each of the images identified into a panoramic image, for example) and such information makes the search for fiducial(s) in the images a great deal simpler. The stitching process continues with a search for the first fiducial in the first identified image, at 507. The search can be accomplished by several means, such as that described in U.S. Pat. No. 5,611,033 or similar feature-searching processes, but since the details regarding the shape and color of the fiducial are already known, the search process is basically one of looking for the correct combination of pixels in the stored image. Once this search is concluded successfully, the found fiducial pixel locations are stored with an association to the first image. Assuming the fiducial has been found, at 509, the process moves to the next identified image for the panorama. (An error message and options are presented to the user if the fiducial is not found). The next image is searched in a manner similar to the search for the first image for the substantially identical fiducial that was found in the first image, at 511. The found fiducial pixel locations are stored for this second image. If another image is to be stitched to the second image, determined at 513 from the uploaded fiducial information, the second image is searched for the next fiducial shape/color and that found fiducial pixel locations are also stored in association with the second image. Once all the fiducials are successfully found, at 515, the next image is searched and the process continues, at 517, until all of the images for the given panorama have been searched.

The computation required for the stitching can continue, at 519, as the images are processed into the panoramic image. Several techniques are known and can be employed in the preferred embodiment to provide a panoramic image having a corrected image perspective, initial images color correction, and the like, once the images are correlated when the fiducials are matched image to image, at 518. Having known fiducial shapes, sizes, and colors greatly simplifies the overlaying of images since the fiducials not only provide an overlaying reference mark, but also image size comparisons (so that the images can be enlarged or reduced for best match), and image rotation information. For example, that technique described in the aforementioned U.S. Pat. No. 5,611,033 or that described in U.S. Pat. No. 5,987,164 or a similar technique can be used to orient the images and modify the size of the images for a satisfactory stitching into a panorama. Once the images are processed and stitched into a panoramic image, the panoramic image is stored, at 521, and a second set of images for another panoramic image may be processed.

Figure 6:
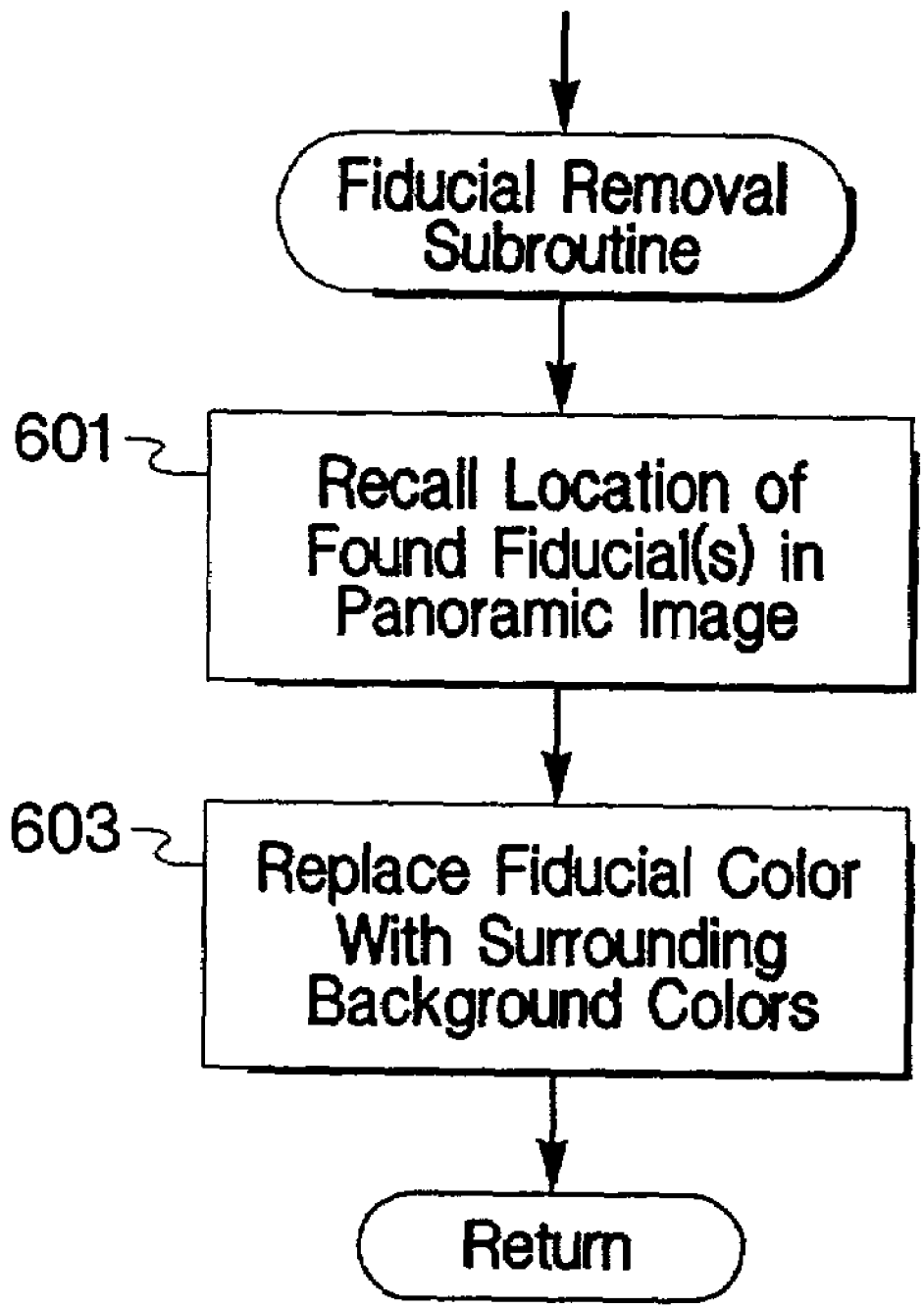
FIG. 6 is a flowchart of a fiducial removal process which may be employed as part of the process of FIG. 5 in the present invention.

A user would, understandably, not want to have the fiducial(s) remain a part of the panoramic image. Accordingly, the fiducial(s) are removed, in the preferred embodiment, as part of the image processing for stitching 519. A subroutine, shown as a flowchart in FIG. 6, is called from step 519 and the location(s) of the fiducials are recalled, at 601. An aforementioned feature of the present invention is that information about the fiducial(s) is already known. In the present fiducial removal subroutine, a process similar to "red-eye" removal in digital photographs is practiced. Such processes are described in U.S. Pat. Nos. 6,016,354 and 6,009,209, for example. The difficult task of identifying the pixels for replacement has already been accomplished in the preferred embodiment. The luminance and color of the pixels adjacent to the fiducial pixels are identified and are used to replace the fiducial pixels, at 603, in a manner that causes the fiducial to disappear into the background.

Thus, an apparatus and method that enables the capture of several scenes and the stitching together of the scenes into a panorama has been shown and described. This apparatus and method simplifies the establishment of a relationship between scenes without leaving undesirable vestiges in the final image.

We claim:

1. A method of enabling the stitching of digital images together, comprising the steps of:
   generating a fiducial with a fiducial generator;
   positioning said fiducial generator to project said fiducial into a three dimensional subject scene at a user determined location in said subject scene;
   capturing, as a first image, a first portion of said subject scene, including said projected fiducial; and
   capturing, as a second image, a second portion of said subject scene, including said projected fiducial, said second portion overlapping at least that part of said first portion containing said fiducial.

2. A method in accordance with the method of claim 1 further comprising the step of combining said first image and said second image into a stitched image by matching said fiducial in said first image with said fiducial in said second image.

3. A method in accordance with the method of claim 1 wherein said step of capturing said second portion further comprises the step of repositioning an image capturing device to determine said second portion without repositioning said fiducial generator.

4. A method in accordance with the method of claim 1 wherein said step of generating further comprises the step of energizing a source of electromagnetic radiation for a period of time.

5. A method in accordance with the method of claim 4 wherein said step of capturing a first portion further comprises the step of energizing said fiducial generator for a period of time sufficient for said projected fiducial to be included in said first portion.

6. A method in accordance with the method of claim 5 wherein said step of capturing a second portion further comprises the step of energizing said fiducial generator for a period of time sufficient for said projected fiducial to be included in said second portion.

7. A method in accordance with the method of claim 2 further comprising the steps of:
   recalling the location of found fiducials in said stitched image;
   replacing the found fiducials with colors derived from said stitched image, thereby removing said captured fiducial from said stitched image.

8. A method in accordance with the method of claim 1 wherein said step of generating a fiducial further comprises the step of generating an essentially monochromatic fiducial.

9. A method in accordance with the method of claim 1 wherein said step of generating a fiducial further comprises the step of generating a fiducial having the shape of a numeric or alphabetic character.

10. A digital image capturing apparatus adapted to image panoramic scenes comprising:
    a fiducial generator to project a fiducial into a three dimensional scene at a user determined location in said scene;
    an electromagnetic to digital image signal converter;
    a memory;
    at least one user control; and
    a processor coupled to said fiducial generator to detect the presence of said fiducial generator and coupled to said electromagnetic to digital image signal converter and said memory to convert and store a first image representation containing said fiducial as a digital signal in a first storage location in said memory when said fiducial generator presence is detected and said at least one user control is activated.

11. A digital image capturing apparatus in accordance with claim 10 further comprising a second storage location in said memory for storing a second image representation containing said fiducial and a storage of an indicator of a relationship between said first image representation and said second image representation.

12. A digital image capturing apparatus in accordance with claim 11 further comprising an output port whereby said first image representation and said second image representation are transmitted from the digital image capturing apparatus.

13. A digital image capturing apparatus in accordance with claim 10 wherein said processor further comprises a fiducial generator activator that causes said fiducial generator to be energized when said at least one user control is activated.

* * * * *